(12) United States Patent
Murata et al.

(10) Patent No.: US 8,035,878 B2
(45) Date of Patent: Oct. 11, 2011

(54) ACTUATOR, OPTICAL SCANNER AND IMAGE-FORMING DEVICE

(75) Inventors: Akihiro Murata, Hokuto (JP); Hiroaki Hosomi, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/977,637

(22) Filed: Dec. 23, 2010

(65) Prior Publication Data

US 2011/0090552 A1   Apr. 21, 2011

Related U.S. Application Data

(63) Continuation of application No. 12/767,914, filed on Apr. 27, 2010, now Pat. No. 7,884,990, which is a continuation of application No. 11/856,135, filed on Sep. 17, 2007, now Pat. No. 7,733,551.

(30) Foreign Application Priority Data

Sep. 20, 2006   (JP) ................................. 2006-255085

(51) Int. Cl.
*G02B 26/08* (2006.01)
(52) U.S. Cl. .................................................... 359/224.1
(58) Field of Classification Search ..... 359/196.1–226.1
See application file for complete search history.

(56) References Cited

U.S. PATENT DOCUMENTS

| 6,188,504 | B1 | 2/2001 | Murakami et al. | |
| 6,775,043 | B1 * | 8/2004 | Leung et al. | 359/200.8 |
| 6,919,980 | B2 | 7/2005 | Miyajima et al. | |
| 7,593,029 | B2 | 9/2009 | Satoh et al. | |
| 2009/0290205 | A1 | 11/2009 | Satoh et al. | |

FOREIGN PATENT DOCUMENTS

| JP | 07-092409 | | 4/1995 |
| JP | 08-122689 | A | 5/1996 |
| JP | 11-242180 | | 9/1999 |
| JP | 2001-264676 | | 9/2001 |
| JP | 2001-272626 | | 10/2001 |
| JP | 2003-172897 | A | 6/2003 |
| JP | 2004-151687 | | 5/2004 |
| JP | 2004-191953 | | 7/2004 |
| JP | 2005-326463 | | 11/2005 |

OTHER PUBLICATIONS

Paul Horowitz and Winfield Hill "The Art of Electronics" 1989, Cambridge University Press, 2nd edition, p. 596.

* cited by examiner

*Primary Examiner* — Euncha Cherry
(74) *Attorney, Agent, or Firm* — Maschoff Gilmore & Israelsen

(57) ABSTRACT

An actuator, includes: a weight part; a supporting part supporting the weight part; a connecting part coupling the weight part rotatable to the supporting part and having an elastic part; a driving member for driving and rotating the weight part; and a semiconductor circuit for driving the weight part. The driving member is operated to torsionally deform the elastic part and rotate the weight part. The elastic part has a first silicon part that is mainly made of silicon and a first resin part that is mainly made of resin and coupled to the first silicon part. The supporting part has at least a second silicon part made mainly of silicon and coupled to the first silicon part of the elastic part. The semiconductor circuit is provided on the second silicon part of the supporting part.

4 Claims, 10 Drawing Sheets

ACTUATOR, OPTICAL SCANNER AND IMAGE-FORMING DEVICE

CROSS-REFERENCE TO A RELATED APPLICATION

This application is a continuation of U.S. application Ser. No. 12/767,914 filed Apr. 27, 2010 which was a continuation of U.S. patent application Ser. No. 11/856,135 filed Sep. 17, 2007 which claimed priority to Japanese Patent Application Number 2006-255085 filed Sep. 20, 2006. The entire disclosures of these applications are expressly incorporated herein by reference.

BACKGROUND OF THE INVENTION

1. Technical Field

The present invention relates to an actuator, an optical scanner and an image-forming device.

2. Related Art

JP-A-2004-191953 is a first example of related art, and JP-A-2005-326463 is a second example of the related art.

As an example of an optical scanner which is for drawing an image through optical-beam scanning and equipped in a laser printer or the like, one using an actuator having a torsional vibrating element has been known (see the first example.)

The first example discloses an actuator having a torsional vibrating element of a single-degree-of-freedom vibration system. This actuator has the torsional vibrating element of a single-degree-of-freedom vibration system that includes a weight member, a fixing frame and a pair of torsional springs that couples the weight member rotatable to the fixing frame. The both sides of the weight member are supported by the torsional springs. A light reflecting part that has a light reflectivity is provided on the weight member. The weight member turns when the pair of the torsional springs is distorted and deformed. Light is reflected at the light reflecting part and the scanning is performed. In this way, an image can be drawn through the optical-beam scanning.

In this actuator, the weight member, the pair of the torsional springs and the fixing frame are fabricated together so as to form a single body by etching a silicone substrate (a silicon wafer).

When the weight member should be turned rapidly, a torsional spring constant of the elastic part has to be high. There are two ways, for example, to make the torsional spring constant high: one is to make the thickness of the elastic part larger, and the other is to make the longitudinal length of the elastic part shorter.

However, when the above-two ways are applied to silicon which is relatively hard material, the amount of a change in the torsional spring constant with respect to a change in the length or/and the thickness of the elastic part becomes too large. In other words, it is difficult to perform a fine adjustment of the torsional spring constant at the elastic part.

When the weight member should be turned slowly, the torsional spring constant of the elastic part has to be low. There are two ways, for example, to make the torsional spring constant high: one is to make the longitudinal length of the torsional spring longer, and the other is to increase the weight of the weight member.

However, the above-two ways increases the size of the actuator. This means that it is difficult to drive the weight member slowly while downsizing the actuator at the same time. For these reason, the actuator according to the first example has difficulty in downsizing and the fine adjustment of the torsional spring constant. Therefore, the actuator according to the first example cannot be accommodated for many applications (for example a high-speed driving actuator, a low-speed driving actuator and the like).

The second example discloses an optical deflector having a torsional vibrating element of a single-degree-of-freedom vibration system. The optical deflector has the torsional vibrating element of the single-degree-of-freedom vibration system which includes a movable plate of which two sides are held by elastic support members (torsional springs). A reflective face (a micro-mirror) having a light reflectivity is provided on the movable plate. The movable plate turns when the elastic support members are distorted and deformed. Light is reflected at the reflective face and the scanning is performed. In this way, a image can be drawn through the optical-beam scanning.

In the optical deflector, a strain gauge whose resistance changes corresponding to the degree of the distortion of the elastic support member is provided. A torsional strain detection circuit detects the variation in the resistance of the strain gauge and a driving circuit of the optical deflector is controlled based on the results obtained through the detection circuit. Thereby a highly accurate scanning can be performed.

However, according to the second example, the torsional strain detection circuit or/and the driving circuit are not provided in the optical deflector itself. Therefore, the size of the deflector will become large if these are installed in the deflector and it is difficult to downsize the deflector.

SUMMARY

An advantage of the present invention is to provide an actuator with which a fine adjustment of a spring constant is possible while downsizing, and to provide an optical scanner and an image forming device thereof.

An actuator according to a first aspect of the invention includes a weight part, a supporting part supporting the weight part, a connecting part coupling the weight part rotatable to the supporting part and having an elastic part, a driving member for driving and rotating the weight part, a semiconductor circuit for driving the weight part, wherein the driving member is operated to torsionally deform the elastic part and rotate the weight part, the elastic part has a first silicon part that is mainly made of silicon and a first resin part that is mainly made of resin and coupled to the first silicon part, the supporting part has at least a second silicon part made mainly of silicon and coupled to the first silicon part of the elastic part, and the semiconductor circuit is provided on the second silicon part of the supporting part. According to the first aspect of the invention, it is possible to provide the actuator in which a fine adjustment of a spring constant is possible while reducing the size of the actuator.

It is preferable that the actuator further include a behavior detector detecting a behavior of the weight part, the behavior detector including a stress detection element provided on the elastic part, and an amplifier circuit coupled to the stress detection element, the behavior detector detecting the behavior of the weight part based on a signal from the amplifier circuit, wherein the semiconductor circuit includes the amplifier circuit. In this way, the distance between the amplifier circuit and the stress detection element can be made small. This prevents noise from being generated between the amplifier circuit and the stress detection element thereby the behavior of the weight member can be more precisely detected.

Alternatively it is preferable that the actuator further include a behavior detector detecting a behavior of the weight part, the behavior detector including a light receiving element provided on the weight part, and an amplifier circuit coupled to the light receiving element, the behavior detector detecting the behavior of the weight part based on a signal from the amplifier circuit, wherein the semiconductor circuit includes the amplifier circuit. In this way, the distance between the amplifier circuit and the light receiving element can be made small. This prevents noise from being generated between the amplifier circuit and the light receiving element thereby the behavior of the weight member can be more precisely detected.

It is also preferable that the actuator further include a controller controlling the operation of the driving member based on a detection result of the behavior detector. In this way, the actuator can be rotated with a desired rotation characteristic.

It is also preferable that the first silicon part of the elastic part and the first resin part of the elastic part be layered in a thickness direction of the weight part when the weight part is viewed in plan. In this way, the elastic part can be formed so as to be symmetric with respect to the parallel line and the perpendicular line to the rotational central axis of the weight part when it is viewed in plan. Thereby the weight part can be stably rotated.

It is also preferable that the elastic part have an elongate rectangular shape and the first silicon part is formed throughout the elastic part in a longitudinal direction of the elastic part. In this way, the mechanical strength of the actuator can be improved.

It is also preferable that the first resin part be formed throughout the elastic part in the longitudinal direction of the elastic part. In this way, it is possible to prevent the variation in the torsional spring constants of a pair of the elastic part caused by the positional displacement between the first silicon part of the elastic part and the first resin part of the elastic part.

It is also preferable that a thickness of the elastic part be uniform throughout the elastic part in the longitudinal direction. In this way the physical characteristic of the elastic part can be made uniform throughout the elastic part in the longitudinal direction.

It is also preferable that a thickness of the first silicon part of the elastic part be uniform throughout the elastic part in the longitudinal direction. In this way the physical characteristic of the elastic part can be made uniform throughout the elastic part in the longitudinal direction.

It is preferable that the supporting part have the second resin part that is formed so as to have a single body integrally with the first resin part of the elastic part and is made of the same material as the material forming the first resin part. In this way, it is possible to enhance the mechanical strength of the actuator.

It is preferable that the second resin part of the supporting part be formed so as to cover the semiconductor circuit. With this structure, a wiring for the amplifier circuit and the like can be formed on the second resin part of the supporting part. This can prevent short-circuit in the semiconductor circuit. Moreover, this expands the design freedom of the wiring pattern and the like and it is possible to simplify the manufacturing process of the actuator.

It is preferable that the weight part have a third resin part that is formed so as to have a single body integrally with the first resin part of the elastic part and is made of the same material as the material forming the first resin part. In this way, it is possible to enhance the mechanical strength of the actuator.

It is preferable that the driving member include a coil provided on the third resin part of the weight part and a voltage supply applying a voltage to the coil, the weight part is rotated by applying the voltage to the coil through the voltage supply. In this way, the third resin part of the weight part serves as an insulating layer and this can prevent short-circuit between the coils. In addition, it is not necessary to separately provide an insulating layer so that the manufacturing process of the actuator can be simplified.

It is preferable that a light reflecting part having a light reflecting property be provided on the weight part. In this way, the actuator can be used as an optical device.

An optical scanner according to a second aspect of the invention includes a weight part having a light reflecting part that has a light reflecting property; a supporting part supporting the weight part; a connecting part coupling the weight part rotatable to the supporting part and having an elastic part; a driving member for driving and rotating the weight part; and a semiconductor circuit for driving the weight part, wherein the driving member is operated to torsionally deform the elastic part and rotate the weight part, the elastic part has a first silicon part that is mainly made of silicon and a first resin part that is mainly made of resin and coupled to the first silicon part, the supporting part has at least a second silicon part made mainly of silicon and coupled to the first silicon part of the elastic part, the semiconductor circuit is provided on the second silicon part of the supporting part, and the scanner scans a light beam reflected by the light reflecting part. According to the second aspect of the invention, it is possible to provide the optical scanner in which a fine adjustment of a spring constant is possible while reducing the size of the optical scanner.

An image-forming device according to a third aspect of the invention includes an optical scanner which includes a weight part having a light reflecting part that has a light reflecting property; a supporting part supporting the weight part; a connecting part coupling the weight part rotatable to the supporting part and having an elastic part; a driving member for driving and rotating the weight part; and a semiconductor circuit for driving the weight part, wherein the driving member is operated to torsionally deform the elastic part and rotate the weight part, the elastic part has a first silicon part that is mainly made of silicon and a first resin part that is mainly made of resin and coupled to the first silicon part, the supporting part has at least a second silicon part made mainly of silicon and coupled to the first silicon part of the elastic part, the semiconductor circuit is provided on the second silicon part of the supporting part, and the scanner scans a light beam reflected by the light reflecting part. According to the third aspect of the invention, it is possible to offer the small sized image-forming device which has a fine image drawing characteristic.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention for an actuator, an optical scanner and an image-forming device will be described.

First Embodiment

An actuator according to a first embodiment of the invention is now described.

Figure 1:
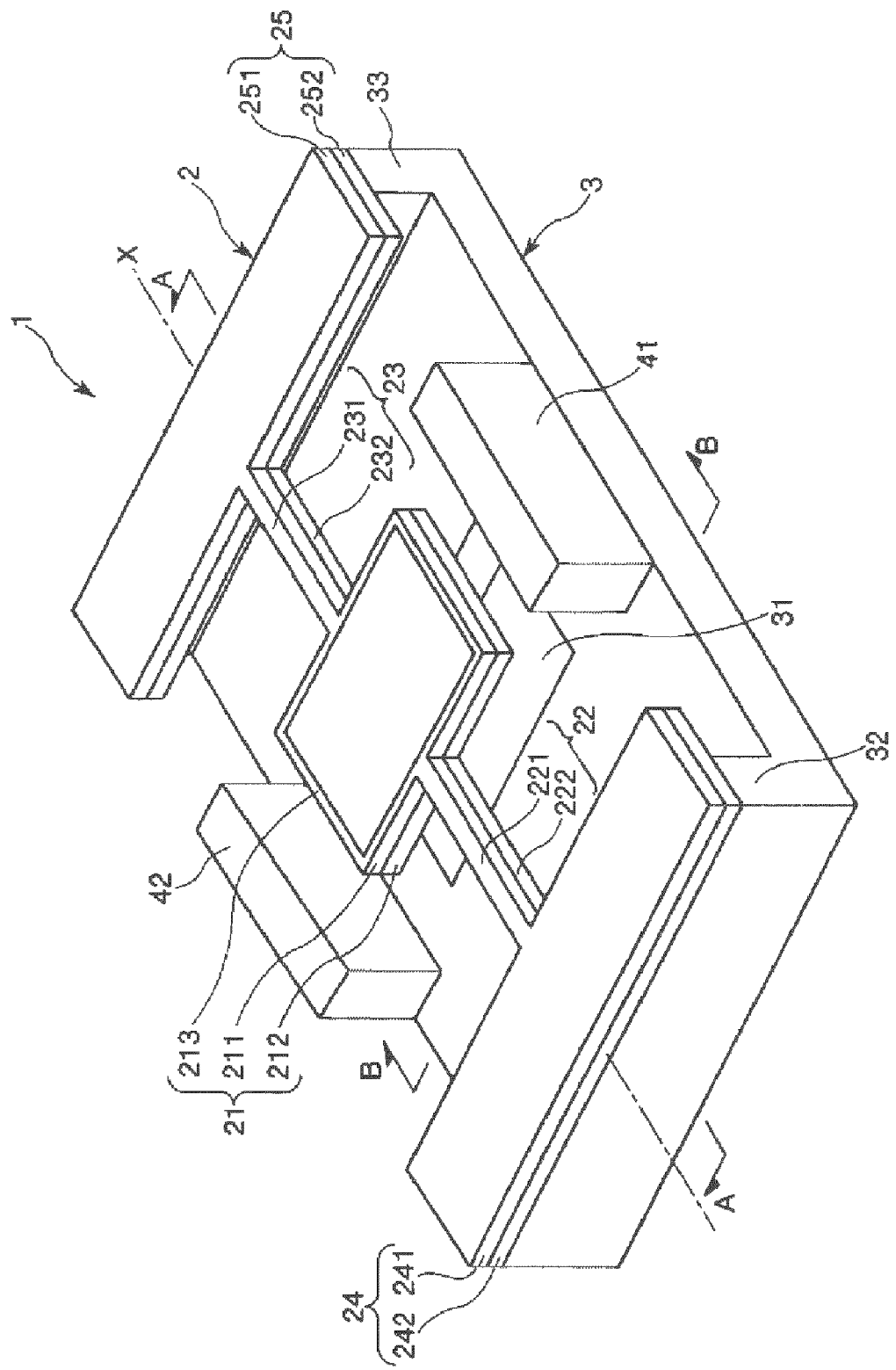
FIG. 1 is a perspective view of an actuator according to a first embodiment of the invention.
Figure 2:
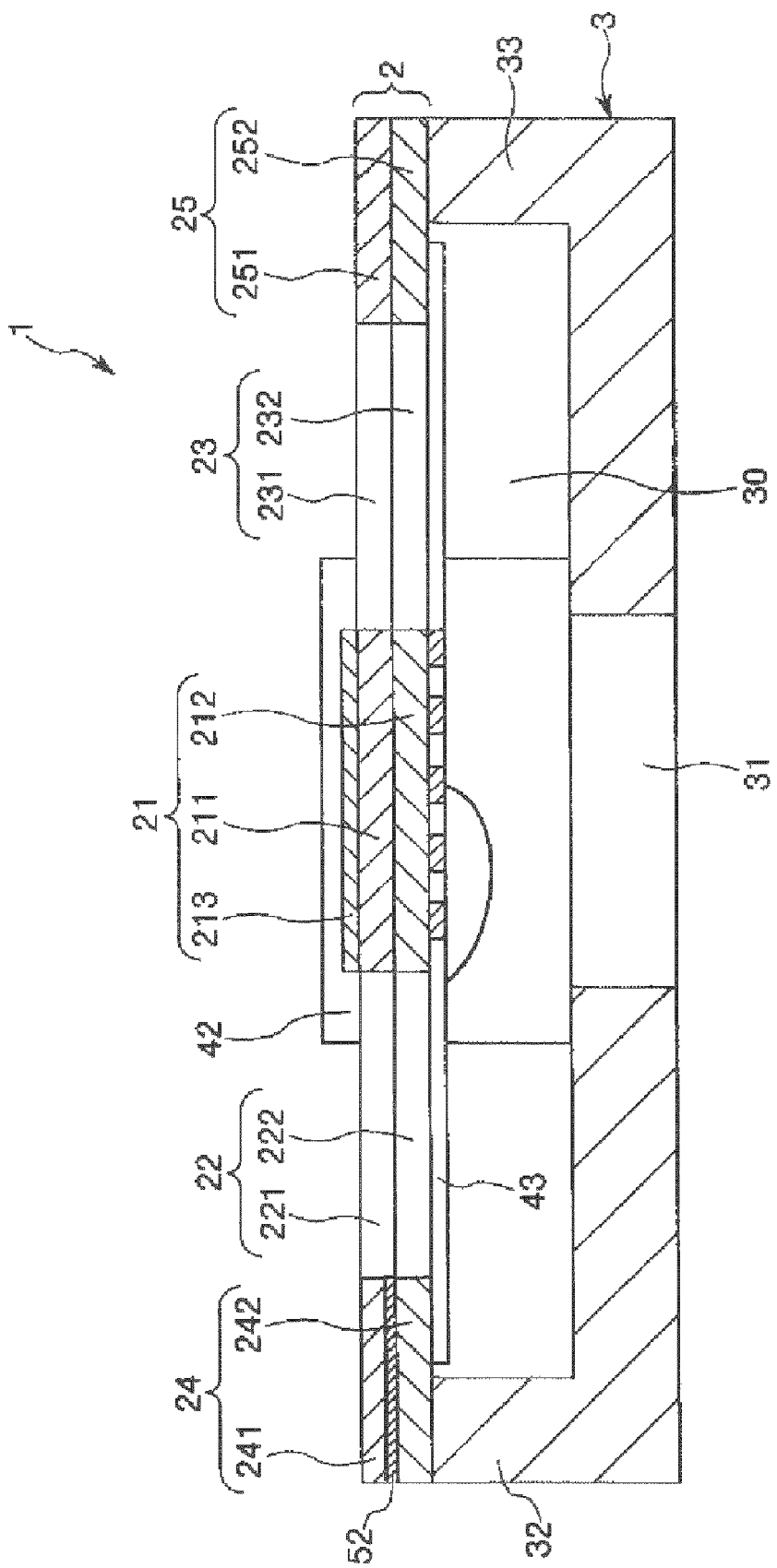
FIG. 2 is a sectional view along the line A-A in FIG. 1.
Figure 3:
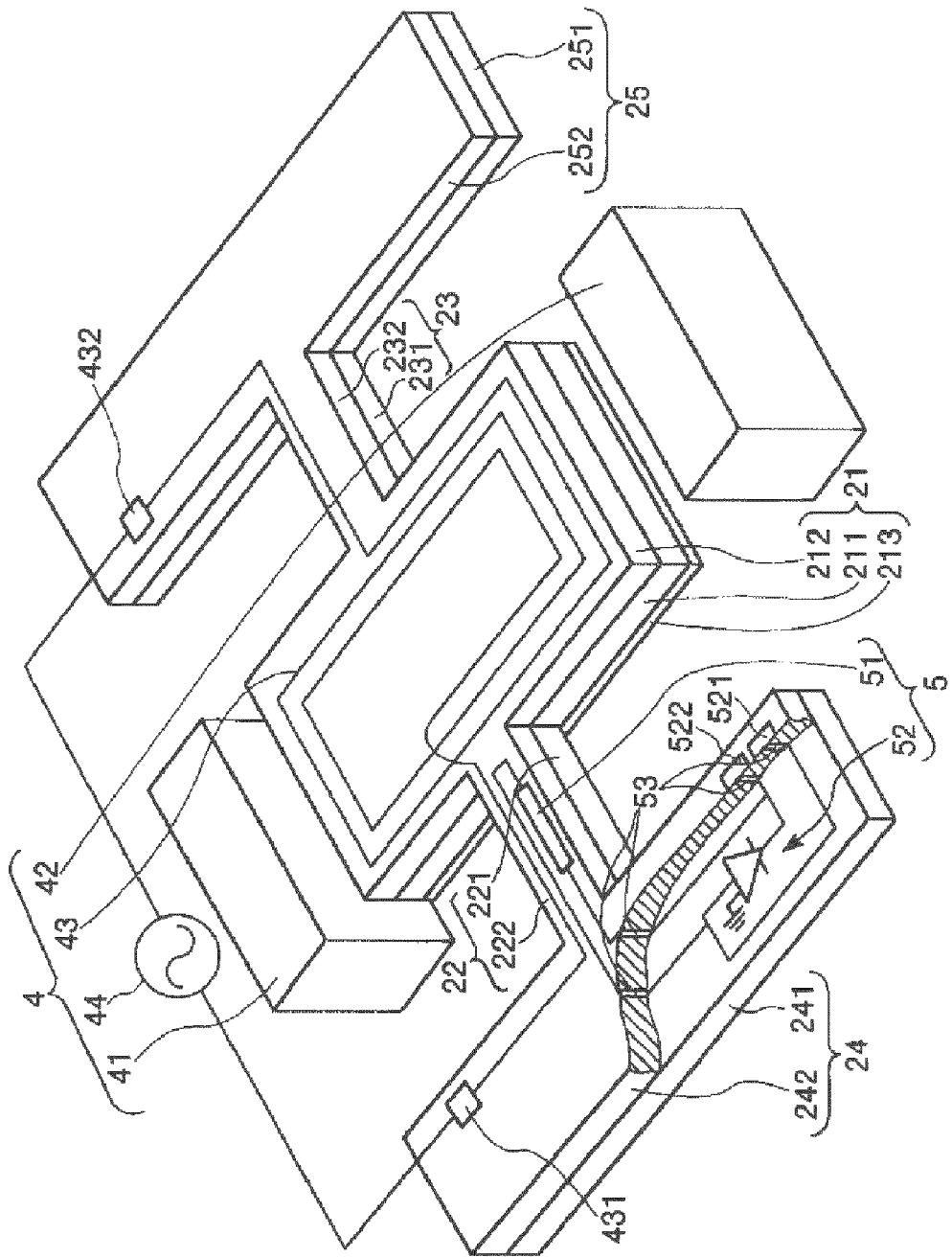
FIG. 3 is an explanatory drawing for a driving member.
Figure 4:
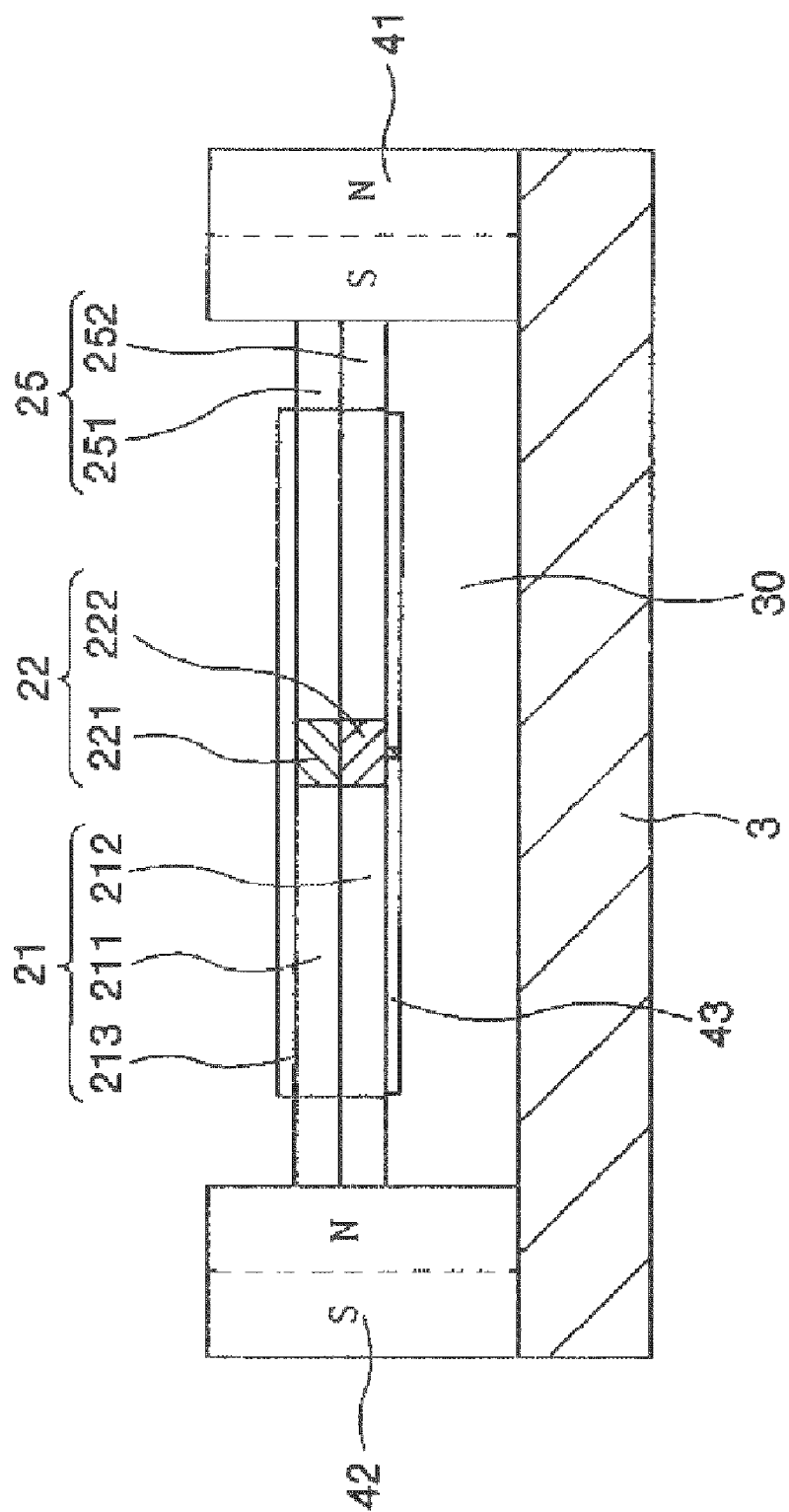
FIG. 4 is a sectional view along the line B-B in FIG. 1.
Figure 5:
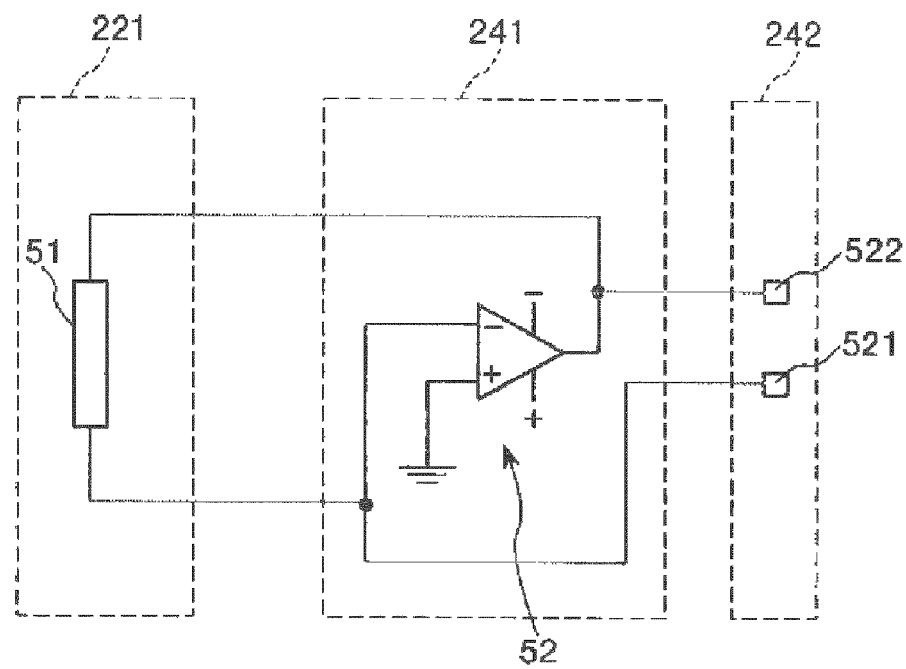
FIG. 5 is an explanatory drawing for a behavior detector and a semiconductor circuit.
Figure 6:
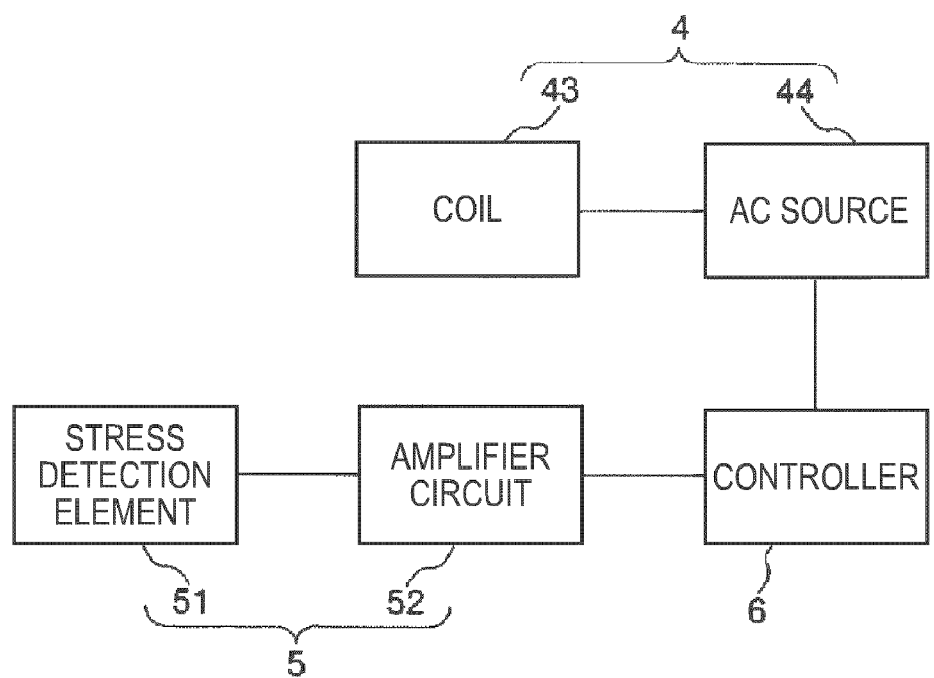
FIG. 6 is a block diagram for explaining a control system.

FIG. 1 is a perspective view of the actuator according to the first embodiment, FIG. 2 is a sectional view along the line A-A in FIG. 1, FIG. 3 is an explanatory drawing for a driving member and a semiconductor circuit, FIG. 4 is a sectional view along the line B-B in FIG. 1, FIG. 5 is an explanatory drawing for a semiconductor circuit, and FIG. 6 is a block diagram for explaining a control system.

In the following description, near, far, right, and left in the pages of FIG. 1 and FIG. 3 will be referred to as "upper," "lower," "right," and "left," respectively. Upper, lower, right and left in the pages of FIG. 2 and FIG. 4 will be referred to as "upper", "lower", "right" and "left" respectively.

Referring to FIG. 1, an actuator 1 includes a base member 2 having a single-degree-of-freedom vibration system and a supporting substrate 3 that supports the base member 2. The actuator 1 further includes a driving member 4 which turns a weight part 21, a behavior detector 5 which detects behaviors of the weight part 21 and a controller 6 that controls the driving of the driving member 4.

The base member 2 includes the weight part 21, a pair of connecting parts 22, 23, and a pair of supporting parts 24, 25. The connecting parts 22, 23 are formed from elastic parts which are flexible and deformable and have an elongate rectangular shape thereby the connecting parts 22, 23 can be also referred as elastic parts 22, 23 respectively in the following description.

The pair of the elastic parts 22, 23 are distorted and deformed when a voltage is applied to a hereunder-described coil 43, this turns round the weight part 21 in the actuator 1. The weight part 21 is rotated on the X-rotational central axis which is shown in FIG. 1. The pair of the elastic parts 22, 23 is provided so as to be substantially symmetric with respect to the weight part 21 as the center when the weight part 21 is not driven and viewed in plan. In other words, the actuator 1 is formed so as to produce a symmetric appearance with respect to the weight part 21 as the center when the weight part 21 is not driven and viewed in plan.

The weight part 21 includes a silicon part 211 that is made mainly from silicon and has a plate shape, a resin part 212 whose face is adhered to a lower face (a face opposing the supporting substrate 3) of the silicon part 211, and a light reflecting part 213 that is provided on a upper face (an opposite face to the resin part 212) of the silicon part 211. In other words the weight part 21 has a layered structure in which the resin part 212 is formed on one side of the silicon part 211 and the light reflecting part 213 is formed on the other side of the silicon part 211 and these layers are stuck in the thickness direction of the plane of the silicon part 211. The resin part 212 and the light reflecting part 213 sandwiches the silicon part 211 therebetween and this three-layered structure forms the weight part 21.

A hardness of the silicon forming the silicon part 211 of the weight part 21 is usually harder (less warped) than the resin material forming the resin part 212 of the weight part 21. Therefore it is possible to enhance the mechanical strength of the weight part 21 and warpage, distortion and deflection of the weight part 21 can be controlled.

The hereunder-described coil 43 is provided on a lower face (a face opposite to the silicon part 211) of the resin part 212 in the weight part 21.

The supporting part 24 includes a silicon part 241 that is made mainly from silicon and has a plate shape, and a resin part 242 whose plate-shaped face is adhered to a lower face of the silicon part 241 and which is made mainly from resin. The resin part 242 is layered over the silicon part 241. In the same manner, the supporting part 25 includes a silicon part 251 that is made mainly from silicon and has a plate shape, and a resin part 252 whose plate-shaped face is adhered to a lower face of the silicon part 251 and the a resin part 252 is made mainly from resin. A hereinafter-described amplifier circuit (a semiconductor circuit) 52 is formed on a lower face of the silicon part 241 of the supporting part 24.

The elastic part 22 couples the weight part 21 to the supporting part 24 so as to make the weight part 21 rotatable with respect to the supporting part 24. In the same manner, the elastic part 23 couples the weight part 21 to the supporting part 25 so as to make the weight part 21 rotatable with respect to the supporting part 25. The elastic parts 22, 23 are formed to have the same shape and size.

The elastic part 22 and the elastic part 23 are situated on the same axis. The weight part 21 rotates on the axis of these elastic parts which is the X-rotational central axis (axis of the rotation) against the supporting parts 24, 25. A hereinafter-described stress detection element 51 is provided in the elastic part 22.

The elastic part 22 and the elastic part 23 are now described in detail. The elastic part 22 and the elastic part 23 have the same structure so that only the elastic part 22 will be described as the typical example and description of the elastic part 23 will be hereunder omitted.

The elastic part 22 has a silicon part 221 that is mainly made from silicon, and a resin part 222 that is mainly made from resin and coupled to the silicon part 221. With this structure, it is possible to perform a fine adjustment of the torsional spring constant of the elastic part 22. More specifically describing this, a hardness of resin material is generally lower (in other words softer) than that of silicon. For example, where the torsional spring constant of the elastic part 22 is varied by changing the thickness (the length in the perpendicular direction to the face of the weight part 21) of the elastic part 22, the amount of the variation in the torsional spring constant of the elastic part 22 relative to the amount of the change in the thickness of the resin part 222 is smaller than the amount of the variation in the torsional spring constant of the elastic part 22 relative to the amount of the change in the thickness of the silicon part 221. It follows that the fine adjustment of the torsional spring constant of the elastic part 22 is possible by changing the thickness (film thickness) of the resin part 222.

The torsional spring constant of the elastic part 22 can be changed in a wide range by adjusting (changing) a structural proportion (such as the thickness ratio) of the resin part 222 to the silicon part 221. Moreover, the amplifier circuit (the semiconductor circuit) 52 is formed in the supporting part 24 as described above so that the supporting part 24 can be utilized.

In this way it is possible to provide the actuator 1 which can be easily changed according to an application (for example a high-speed driving actuator, a low-speed driving actuator and the like) while the size of the actuator 1 is minimized. Furthermore, the actuator 1 can be modified to various applications by simply changing the thickness of the elastic parts 22, 23 without changing the planar shape of the actuator 1. Therefore it is possible to simplify the manufacturing method of the actuator 1 and reduce the manufacturing cost.

The silicon part 221 of the elastic part 22 and the resin part 222 of the elastic part 22 are layered in the thickness direction of the weight part 21 (the perpendicular direction to the face of the weight part 21) when these parts are viewed in plan. Thereby it is possible to adjust (change or perform a fine adjustment of) torsional spring constant of the elastic part 22 by changing the thickness of the silicon part 221 and/or the thickness of the resin part 222 (the length in the perpendicular direction to the face of the weight part 21). Furthermore the elastic part 22 is formed so as to be symmetric with respect to the parallel line and the perpendicular line to the X-rotational central axis when it is viewed in plan. Thereby the weight part 21 can be symmetrically rotated on the X-rotational central axis.

The silicon part 221 in the elastic part 22 is formed throughout the area of the elastic part 22 in the longitudinal direction. This can enhances the mechanical strength of the actuator 1. The resin part 222 in the elastic part 22 is also formed throughout the area of the elastic part 22 in the longitudinal direction. The spring constant of the elastic part 22 can fluctuate if the position of the silicon part 221 is displaced from the position of the resin part 222. This can be prevented according to the embodiment and the actuator 1 can exert the desired vibration characteristics.

The elastic part 22 is formed so as to have a uniform thickness throughout the elastic part 22 in the longitudinal direction. The silicon part 221 is also formed to have a uniform thickness throughout the elastic part 22 in the longitudinal direction. The resin part 222 is further formed to have a uniform thickness throughout the elastic part 22 in the longitudinal direction. Thereby physical characteristic of the elastic part 22 can be made uniform in the longitudinal direction. Consequently, it is possible to rotate the weight part 21 stably.

Relation between the thickness of the silicon part 221 and the thickness of the resin part 222 is now described. For the sake of simplicity, assume that the planar shape of the elastic part 22 remain unchanged. In other words, assume that the length and width of the elastic part 22 don't change.

As described above, the hardness of the resin material forming the resin part 222 is generally lower (in other words softer) than the hardness of silicon. Accordingly if the thickness of the elastic part 22 is constant, the smaller the thickness of the silicon part 221 becomes, the smaller the torsional spring constant of the elastic part 22 becomes. On the contrary, the larger the thickness of the silicon part 221 becomes, the larger the torsional spring constant of the elastic part 22 becomes. In other words, when the thickness of the elastic part 22 is constant, the smaller the thickness of the resin part 222 becomes, the larger the torsional spring constant of the elastic part 22 becomes. On the contrary, the larger the thickness of the resin part 222 becomes, the smaller the torsional spring constant of the elastic part 22 becomes.

By adjusting the thickness of the silicon part 221 and the thickness of the resin part 222 in the above-described manner, it is possible to roughly adjust the torsional spring constant of the elastic part 22. A fine adjustment of the torsional spring constant of the elastic part 22 can be further performed by changing the thickness of the resin part 222.

In this way, the torsional spring constant of the elastic part 22 can be changed both in a wide range and a very small range according to the embodiment of the actuator 1.

Though the elastic part 22 has been described above, the elastic part 22 also has the same structure including the silicon part 221 and the resin part 223 (the description is omitted here as mentioned above). According to the embodiment of the actuator 1, it is possible to adjust (change) the torsional spring constants of the elastic parts 22, 23 both in a wide rage and a very small range.

The weight part 21, the elastic parts 22, 23, and the supporting parts 24, 25 have been described. The weight member 21, t the elastic parts 22, 23, and the supporting parts 24, 25 are fabricated (integrated) so as to form a single body.

The base member 2 has a layered structure of the silicon layers and the resin layers. The silicon layer includes the silicon part 211 of the weight member 21, the silicon part 221 of the elastic part 22, the silicon part 231 of the elastic part 23, the silicon part 241 of the supporting part 24 and the silicon part 251 of the supporting part 25, and these are fabricated so as to form a single body. While the resin layer includes the resin part 212 of the weight part 21, the resin part 222 of the elastic part 22, the resin part 232 of the elastic part 23, the resin part 242 of the supporting part 24 and the resin part 252 of the supporting part 25, and these are fabricated so as to form a single body.

Such base member 2 can be obtained by for example forming the resin layer on a silicon wafer and etching the layer so as to have the corresponding planar shapes of the weight part 21, the elastic parts 22, 23, and the supporting parts 24, 25. In this way, it is possible to simplify the manufacturing process of the base member 2.

Places where the stress most concentrates in the base member 2 when the weight member 21 rotates are the boundaries between the weight part 21 and the elastic parts 22, 23, the boundary between the elastic part 22 and the supporting part 24, and the boundary between the elastic part 23 and the supporting part 25. According to the embodiment, the weight member 21, the elastic parts 22, 23, and the supporting parts 24, 25 are fabricated so as to form the single body so that it is possible to improve the mechanical strength compared to the case where the weight member 21, the elastic parts 22, 23, and the supporting parts 24, 25 are fabricated separately (for example the junction of the weight member 21 and the elastic part 22 is situated at the boundary between the weight member 21 and the elastic part 22). Consequently, the endurance of the actuator 1 can be improved and such actuator 1 will be operated stably for a long time period.

The resin part 212 of the weight part 21, the resin part 222 of the elastic part 22, the resin part 232 of the elastic part 23, the resin part 242 of the supporting part 24 and the resin part 252 of the supporting part 25 are made from the same resin material and so as to form a single body. Any resin materials can be used for the resin layers provided that the weight member 21 is rotatable. For instance various thermoplastic resins and various thermo-setting resins can be used. However it is preferable that thermo-setting resin be used since it has a fine heat resistance and it cannot be easily deteriorated or altered. Therefore the actuator 1 can maintain (exert) a desired rotation property for a long time period by adopting the thermo-setting resin. Such thermo-setting resin is not particularly limited, for example a polyimide resin, a phenol resin, an epoxy resin, an unsaturated polyester resin, a urea resin, a melamine resin, a diallyl phthalate resin or the like can be appropriately used.

Where the actuator 1 is applied to an optical device such as an optical scanner, the temperature of the weight member 21 can rise with the light which is not reflected by the light reflecting part 213. Therefore it is preferable that the resin material having a relatively high melting point or softening point be used though it depends on the conditions in which the actuator is used. In this way, it is possible to prevent the spring constant from being radically (significantly) changed with the rising temperature at the elastic parts 22, 23. Accordingly, the actuator 1 can maintain (exert) a desired scan performance even if the actuator is continuously used for a long time period.

The base member 2 is supported by the supporting substrate 3. A pair of convex portions 32, 33 is formed on the upper face (the face opposing the base member 2) of the supporting substrate 3 and in the position where faces the supporting part 24. In other words, a concave portion 30 is formed on the upper face of the supporting substrate 3. The supporting substrate 3 holds the base member 2 through the supporting parts 24, 25 whose upper faces are coupled to the upper faces of the convex portions 32, 33 respectively.

An opening 31 is provided in the bottom face of the concave portion 30 and at the position where corresponds to the weight member 21. This opening 31 serves as a clearance groove which prevents the weight member 21 from contacting the supporting substrate 3 when the weight member 21 rotates (vibrates). By providing such opening 31 (clearance portion), it is possible to set a larger sway angle (vibration amplitude) of the weight member 21 while keeping the size of the actuator 1 small.

The above-mentioned clearance portion is not necessarily the opening situated at the lower face (the opposite face to the base member 2) of the supporting substrate 3 provided it can sufficiently exert the above-described function as a clearance. For example the clearance portion can be a concave portion formed in the upper face of the supporting substrate 3. In case where the depth of the concave portion 30 (the height of the convex portions 32, 33) is larger than the sway angle (vibration amplitude) of the weight member 21, it is not necessary to provide the opening 31. The supporting substrate 3 may not be necessary depending on the shape of the supporting parts 24, 25 of the base member 2. The supporting substrate 3 is made of for example mainly glass, silicon or the like.

The driving member 4 that is for turning round the weight member 21 will be now described with reference to FIG. 3. FIG. 3 is a partial sectional enlarged view of the lower face (the face opposing the supporting substrate 3) of the base member 2.

Referring to FIG. 3, the driving member 4 includes the coil 43 provided in the resin part 212 of the weight member 21, a AC power source (a voltage supply) 44 that applies voltage to the coil 43, and a pair of magnets provided such that they oppose each other in the direction perpendicular to the X-rotational central axis and they sandwich the weight member 21. Such driving member 4 vibrates (rotates) the weight member 21 with respect to the supporting parts 24, 25 by applying an AC voltage to the coil 43 from the AC power source 44.

The coil 43 is formed throughout the lower face (the opposite face to the supporting substrate 3) of the resin part 212 of the weight member 21 in a volute shape. The resin part 212 serves as an insulating layer so that short-circuit among wirings of the coil 43 can be prevented. In a case where the coil 43 is provided on the silicon part 211, for example, an insulating layer (oxide film layer) has to be separately provided on the resin part 212. According to the actuator 1 of the embodiment, such process to provided an insulating layer is not necessary (can be omitted). The manufacturing process of the actuator 1 can be simplified in this sense. The patterning figure of the coil 43 is not particularly limited as long as the weight member 21 is made rotatable with it.

One end of the wiring (electric wiring) consisting the coil 43 is coupled to a terminal 431 provided on the supporting part 24, and the other end of the wiring is coupled to a terminal 432 provided on the supporting part 25. The terminals 431, 423 are coupled to the AC power source 44. A magnetic field is generated from the coil 43 when an AC voltage is applied to the coil 43 from the AC power source 44.

A magnet 41 and a magnet 42 are provided such that they oppose each other in the direction perpendicular to the X-rotational central axis and they sandwich the weight member 21. The face of the magnet 41 opposing the magnet 42 has the opposite magnetic polarity to the polarity of the face of the magnet 42 opposing the magnet 41. Any magnets can be adopted as such magnets 41, 42. For example, permanent magnets (hard magnetic substances) such as a neodymium magnet, a ferrite magnet, a samarium-cobalt magnet and an alnico magnet can be appropriately used.

The driving member 4 vibrates (rotates) the weight member 21 in the following way. For an illustrative purpose, assume that the face of the magnet 41 opposing the magnet 42 is the south pole and the face of the magnet 42 opposing the magnet 42 is the north pole as shown in FIG. 4. For the sake of description, "upper" and "lower" in the page of FIG. 4 is called "upper" and "lower" in the following description.

The case (hereinafter called a "first state") where a current supplied by the AC power source 44 flows from the terminal 431 to the terminal 432 through the coil 43 is described. In this case, a downward electromagnetic force works at a part of the weight member 21 which is the magnet 42 side with respect to the X-rotational central axis, the downward is the lower side in FIG. 4 (Fleming's left-hand rule is here applied). On the contrary, an upward electromagnetic force works at the other part of the weight member 21 which is the magnet 41 side with respect to the X-rotational central axis, the upward is the upper side in FIG. 4. Thereby the weight member 21 rotates counterclockwise on the X-rotational central axis in FIG. 4.

On the contrary, in the case (hereinafter called a "second state") where a current supplied by the AC power source 44 flows from the terminal 432 to the terminal 431 through the coil 43, the upward electromagnetic force works at the part of the weight member 21 which is the magnet 42 side with respect to the X-rotational central axis, the upward is the upper side in FIG. 4. The downward electromagnetic force works at the other part of the weight member 21 which is the magnet 41 side with respect to the X-rotational central axis, the downward is the lower side in FIG. 4. Thereby the weight member 21 rotates clockwise on the X-rotational central axis in FIG. 4.

The elastic parts 22, 23 are twisted and deformed when the above-mentioned first state and the second state are alternatively repeated. In this way, the weight member 21 is rotated with respect to the supporting part 24.

By using the AC power source 44 as the voltage supply means, the first state and the second state can be switched periodically and smoothly so that the weight member 21 is rotated smoothly. The voltage supply is not particularly limited as long as it can apply voltage to the coil 43 though the embodiment used the AC power source 44. A DC power source can be for example used instead. In this case, the weight member 21 can be rotated with respect to the supporting part 24 by applying a DC voltage intermittently to the coil 43.

The behavior detector 5 which detects behaviors of the weight part 21 is now described.

Referring to FIG. 3 and FIG. 5, the behavior detector 5 includes the stress detection element 51 provided on the lower face (the face in the resin part 222 side) of the silicon part 222 in the elastic part 22, and the amplifier circuit 52 (the semiconductor circuit) that is provided on the silicon part 241 of the supporting part 24 and is electrically coupled to the stress detection element 51. A plurality of through holes 53 through which the stress detection element 51 and the amplifier circuit 52 are coupled each other. An input terminal 521 and an output terminal 522 are provided on the resin part 242 of the supporting part 24. These terminals are electrically coupled to the amplifier circuit 52.

The behavior detector 5 is configured so as to detect the behavior of the weight member 21 based on a signal from the amplifier circuit 52. More specifically, the stress detection element 51 has a property that the resistance value changes according to the degree of the deformation. By providing such stress detection element 51 on the elastic part 22, it is possible to vary the resistance of the stress detection element 51 according to the amount of the torsional deformation of the elastic part 22 (in other words according to the rotation angle of the weight member 21).

A value of the current (the electric signal) that flows through the stress detection element 51 changes when the resistance value of the stress detection element 51 varies, that variation in the electric signal is amplified by the amplifier circuit 52. The behavior of the weight member 21 is detected based on the amplified signal. In this way, the behavior of the weight member 21 can be precisely detected. The variation in the value of the current (the electric signal) caused by the variation in the resistance value of the stress detection element 51 is so small that the electric signal is amplified through the amplifier circuit 52 in this embodiment in order to precisely detect the behavior of the weight member 21.

The amplifier circuit 52 is formed on the silicon part 241 of the supporting part 24 so that the supporting part 24 can be efficiently used. In this way, it is possible to minimize the actuator 1. Such amplifier circuit 52 can be formed by for example diffusing an impurity such as boron, iridium, potassium or the like around the surface of the silicon part 241.

According to the embodiment, the amplifier circuit 52 is placed close to the stress detection element 51 and the distance between the amplifier circuit 52 and the stress detection element 51 is very small. Thereby the length of the wiring that couples the amplifier circuit 52 and the stress detection element 51 can be made short. This prevents noise from being generated between the amplifier circuit 52 and the stress detection element 51 thereby the behavior of the weight member 21 can be more precisely detected.

Here, the distance between the stress detection element 51 and the amplifier circuit 52 can be made shorter by for example providing the amplifier circuit 52 on the silicon part 211 of the weight member 21. In other words, the same advantageous effect as the embodiment of the actuator 1 can be obtained when the amplifier circuit 52 is formed on the silicon part 211 of the weight member 21. However, a mass of the weight member 21 can be made smaller when the amplifier circuit 52 is formed on the supporting part 24 compared with when the amplifier circuit 52 is formed on the weight member 21. This means that the actuator 1 can be easily accommodated both to high-speed driving and to low-speed driving when the amplifier circuit 52 is formed on the supporting part 24. Meanwhile where the actuator 1 is applied to an optical device such as an optical scanner, the temperature of the weight member 21 can rise with the light which is not reflected by the light reflecting part 213. The amplifier circuit 52 will be less affected by heat when the amplifier circuit 52 is formed on the supporting part 24 like this embodiment compared with when the amplifier circuit 52 is provided on the weight member 21. Consequently, it is possible to detect the behavior of the weight member 21 more precisely.

On the lower face of the silicon part 241 where the amplifier circuit 52 is provided, the resin part 242 is further provided so as to cover the amplifier circuit 52. With this structure, a wiring for the amplifier circuit 52 can be patterned on a lower face of the resin part 242. This expands the design freedom and it is possible to simplify the manufacturing process of the actuator 1.

The actuator 1 has the controller 6 that controls the operation of the driving member 4 based on the detection results of the above-described behavior detector 5. Referring to FIG. 6, the controller 6 controls the AC power source 44 based on the signal from the amplifier circuit 52. The actuator 1 can offer a desired rotational property with this controller.

The above-described actuator 1 can be manufactured for example in the following way. FIG. 7 and FIG. 8 are longitudinal sectional views for describing a method of manufacturing the actuator according to the first embodiment. For the sake of description, "upper" and "lower" in the page of FIG. 7 and FIG. 8 is called "upper" and "lower" in the following description. A step for obtaining the base member 2 is referred as Step A1, a step for obtaining the supporting substrate 3 is referred as Step A2, and a step for obtaining the actuator 1 by building up the base member 2 and the supporting substrate 3 is referred as Step A3.

Step A1

Figure 7A:
FIGS. 7A-7F are drawings for describing a method of manufacturing an actuator according to the invention.

Referring to FIG. 7A, a silicon substrate 60 is for example provided. It is preferable that the spring constant be roughly adjusted in advance by adjusting the thickness of the silicon substrate 60 by for example etching. In this way, the actuator 1 having the spring constant accommodated to an application can be easily fabricated.

Figure 7B:
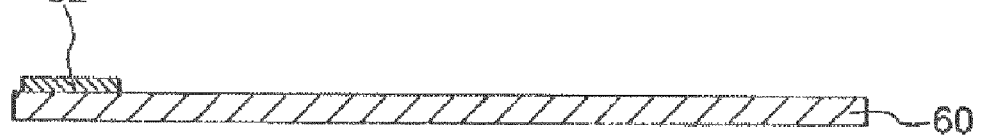

Referring now to FIG. 7B, the amplifier circuit (the semiconductor circuit) 52 is formed on an upper face of the silicon substrate 60 and at the position where corresponds to the supporting part 24. The amplifier circuit 52 can be formed by for example diffusing an impurity such as boron, iridium, potassium or the like.

The stress detection element 51 (unshown in the drawing) is further formed at the position corresponding to the elastic part 22. The stress detection element 51 can be formed by for example forming a metal mask which corresponds to the stress detection element 51 on the silicon substrate 60 and then diffusing an impurity such as boron or the like.

Figure 7C:
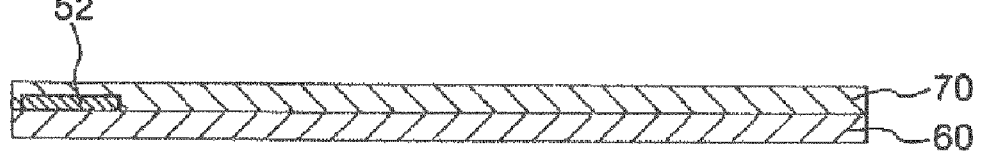

Referring now to FIG. 7C, a resin layer 70 is formed by applying a resin material such as liquid polyimide on the whole upper face (the face on which the amplifier circuit 52 is formed) of the silicon substrate 60 by spin-coating, and then drying and fixing the material. Here a fine adjustment of the spring constants of the elastic parts 22, 23 is possible by adjusting the thickness and/or density of the resin layer 70 or selecting a type of the resin material.

Subsequently the through holes 53 (unshown in the drawing) for wiring the amplifier circuit 52 and the stress detection element 51 are formed.

Figure 7D:

An unshown metal film of Cu, Al or the like is then formed on the upper face of the resin layer 70. At this point, the through holes 53 are filled with the metal material forming the metal film. The metal film is subsequently etched such that the pattern of the metal film corresponds to the pattern (in plan view) of the wirings that couple the coil 43, the amplifier circuit 52 and the stress detection element 51. Through the above-described process, a composite substrate in which the coil 43 and the like is formed on the upper face of the resin layer 70 is obtained as shown in FIG. 7D.

As a method for forming the metal film, there are a vacuum evaporation method, a sputtering (a low-temperature sputtering) method, a dry plating method such as an ion plating, a wet plating method such as an electrolytic plating and an electroless plating, a thermal spraying method, a bonding method of a metal sheet material and the like. The same method can be applied to the formation of metal films in the following steps.

Figure 7E:
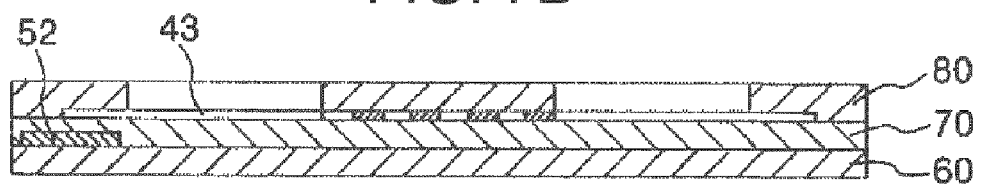
Figure 7F:
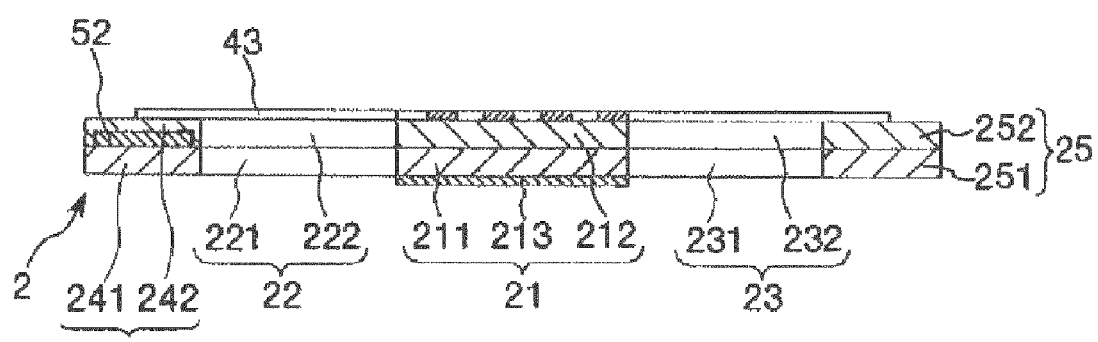

Referring now to FIG. 7E, a metal mask 80 that is made of for example aluminum and that corresponds to the shapes (viewed in plan) of the weight part 21, the supporting parts 24, 25 and the elastic parts 22, 23 is formed on the upper face (the face on which the coil 43 is formed) of the resin part 70.

The silicon substrate 60 and the resin part 70 are etched by using the metal mask 80, and the metal mask 80 is removed after the etching. Through the above-described process, a layered structure of the silicon substrate 60 and the resin part 70 which is etched to have the shapes corresponding to the weight part 21, the supporting parts 24, 25 and the elastic parts 22, 23 is obtained.

As an etching method, physical etching methods such as a plasma etching method, a reactive ion etching method, a beam etching method, and a photo-assisted etching method and the like are applicable here.

A metal film is then formed on the lower face of the silicon part 211 so as to form the light reflecting part 213, and the base member 2 in which the weight part 21, the supporting parts 24, 25 and the elastic parts 22, 23 are formed to have the single body is obtained.

Step A2

Figure 8A:
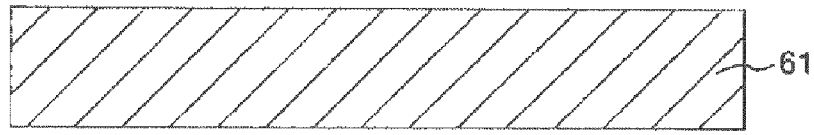
FIGS. 8A-8D are drawings for describing a method of manufacturing an actuator according to the invention
Figure 8B:
Figure 8C:
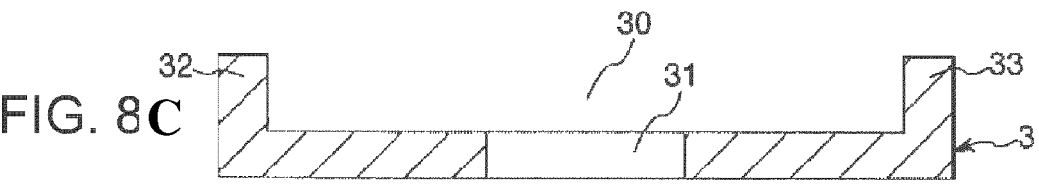
Figure 8D:
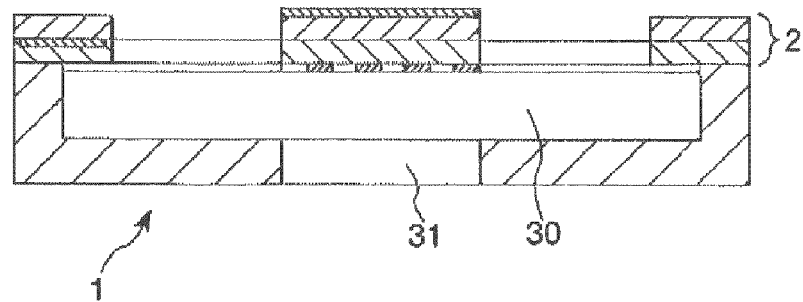

Referring now to FIG. 8G, for example a silicon substrate 61 is provided as the substrate for fabricating the supporting substrate 3.

Referring to FIG. 8H, a metal mask 82 that is made of for example aluminum and that corresponds to the area other than where the opening 31 is going to be formed is formed on one face (the lower face) of the silicon substrate 61. A metal mask 83 that is made of for example aluminum and that corresponds to the concave portion 30 is formed on the other face (the upper face) of the silicon substrate 61.

Subsequently the silicon substrate 61 is etched through the metal mask 83 till it reaches the depth corresponding to the concave portion 30. The metal mask 83 is removed after the etching. The silicon substrate 61 is then etched through the metal mask 82 such that the substrate is penetrated. The metal mask 82 is removed after the etching. Through the above-described process, the supporting substrate 3 in which the concave portion 30 and the opening 31 are formed is obtained as shown in FIG. 8I.

Step A3

Referring to FIG. 8J, the substrate 2 obtained through the above-described Step A1 and the supporting substrate 3 obtained through the above-described Step A2 are jointed through adhesive or the like so as to form the actuator 1.

The actuator 1 according to the first embodiment can be fabricated in the above-described way.

Second Embodiment

An actuator according to a second embodiment of the invention is now described.

Figure 9:
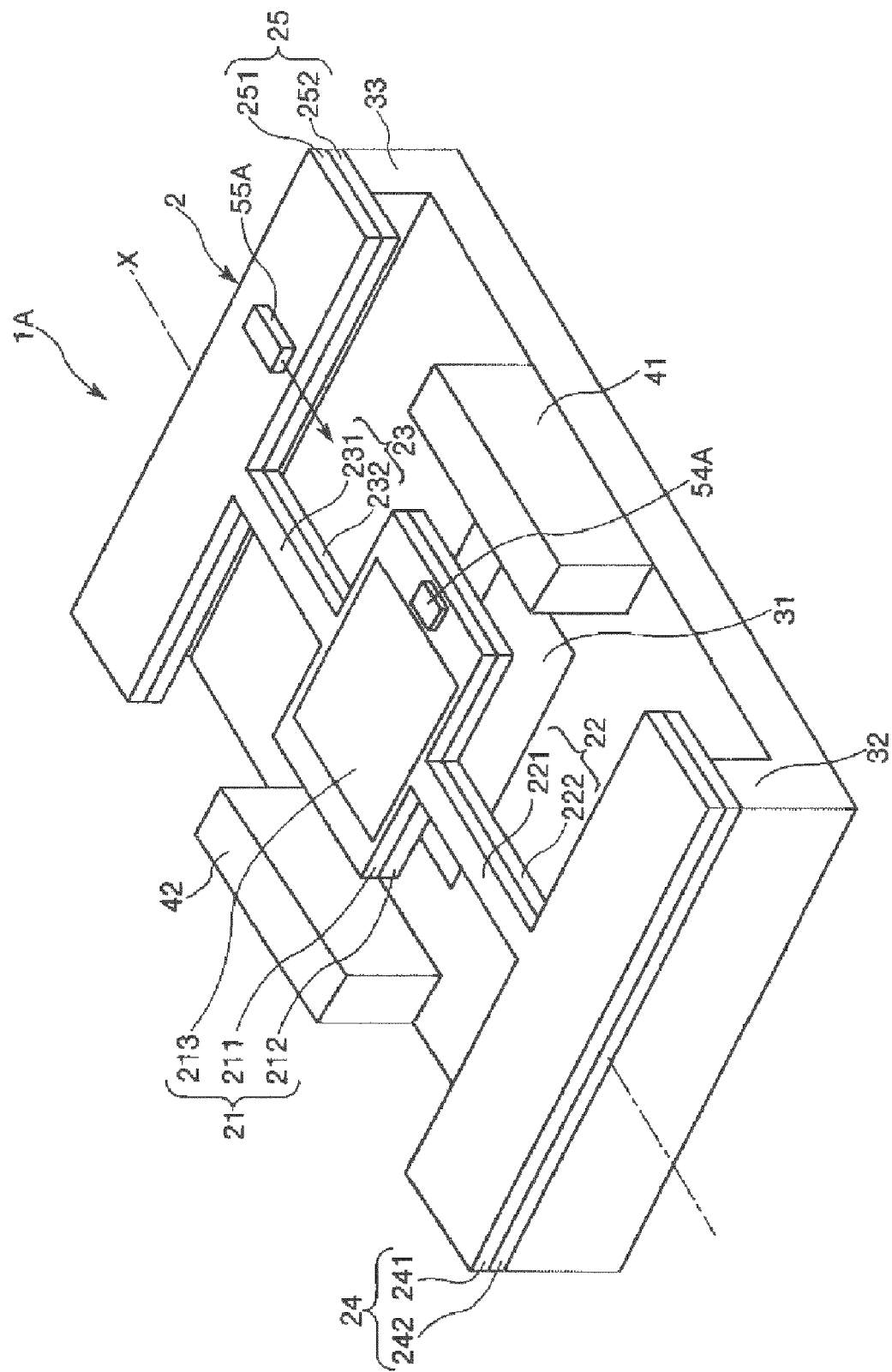
FIG. 9 is a perspective view of the actuator according to the first embodiment.
Figure 10:
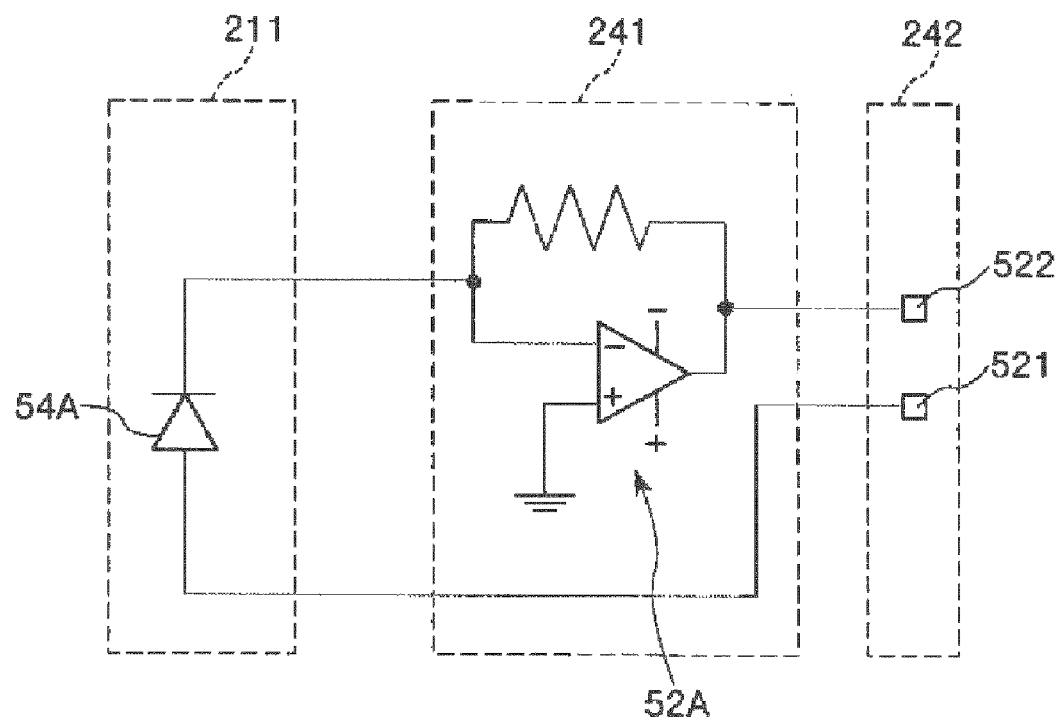
FIG. 10 is an explanatory drawing for a behavior detector and a semiconductor circuit.

FIG. 9 is a perspective view of the actuator according to the second embodiment and FIG. 10 is an explanatory drawing for a behavior detector.

Different structures in an actuator 1A of the second embodiment from the corresponding structures of the actuator 1 according to the first embodiment are mainly hereunder described and descriptions for the same structures will be omitted.

The actuator 1A according to the second embodiment has substantially the same structure as the actuator 1 according to the first embodiment except for the configuration of a behavior detector 5A.

The behavior detector 5A includes a photodiode 54A (an optical element) which is provided in the weight part 21, an amplifier circuit 52A (a semiconductor circuit) formed on the silicon part 241 of the supporting part 24, and a light source 55A provided on the supporting part 25. The behavior detector 5A is configured so as to detect the behavior of the weight member 21 based on a signal from the amplifier circuit 52A. The light source 55A is placed so as to emit a light beam from the supporting part 25 toward the weight member 21 in the direction parallel to the X-rotational central axis.

The photodiode 54A is placed on the weight part 21 such that it can receive the largest amount of the light beam emitted from the light source 55A when the weight part 21 rotates.

The amount of the light beam which the photodiode 54A receives when the weight part 21 rotates can be varied by placing the light source 55A and the photodiode 54A in this way. The photodiode 54A has a property that the amount of running current or generated voltage in the photodiode 54A changes according to the amount of light received. Therefore a value of the current running through the photodiode 54A and a value of the voltage (electric signal) of the photodiode 54A varies according to the rotating motion of the weight part 21. The variation in the electric signal is then amplified by the amplifier circuit 52A. The behavior of the weight member 21 is detected based on the amplified signal. In this way, the behavior of the weight member 21 can be precisely detected by the behavior detector 5.

In this embodiment, the amplifier circuit 52A is formed on the silicon part 241 of the supporting part 24 so that the distance between the amplifier circuit 52A and the photodiode 54A is very small. Thereby the length of the wiring that couples the amplifier circuit 52 and the photodiode 54A can be made short. This prevents noise from being generated between the amplifier circuit 52 and the photodiode 54A thereby the behavior of the weight member 21 can be more precisely detected.

The second embodiment of the actuator has been described. The position where the light source 55A is placed is not particularly limited provided that the photodiode 54A can receive the light beam emitted from the light source 55A. For example, the light source 55A can be placed on the supporting substrate 3 or even outside the actuator 1.

The actuator according to the invention has the light reflecting part so that it can be applied to optical devices such as an optical scanner, an optical switch, and an optical attenuator.

An optical scanner according to an embodiment of the invention has the same structure as the actuator of the above-described embodiments. More specifically, the optical scanner includes the weight part having the light reflecting part, the supporting parts supporting the weight part, the connecting part coupling the weight part rotatable with respect to the supporting part and having the elastic part which is elastically deformable, the driving member for rotating the weight part, and the semiconductor circuit for the driving of the weight part and/or for the detection of the behavior of the weight part. In such optical scanner, the driving member is operated to torsionally deform and rotate the weight part. The scanner scans the light beam reflected by the light reflecting part. The elastic part includes the silicon part mainly made of silicon, and the resin part mainly made of resin and coupled to the silicon part. The supporting part has the silicon part made mainly of silicon and coupled to the silicon part of the elastic part. The semiconductor circuit is provided at the silicon part of the supporting part. In this way, it is possible to provide the optical scanner in which a fine adjustment of the spring constant is possible and whose size can be minimized.

Such optical scanner can be applied to image-forming devices such as a projector, a laser printer, a display for imaging, a bar-code reader and a confocal scanning microscope. Thereby it is possible to provide the image forming device which has a fine image drawing characteristic.

Figure 11:
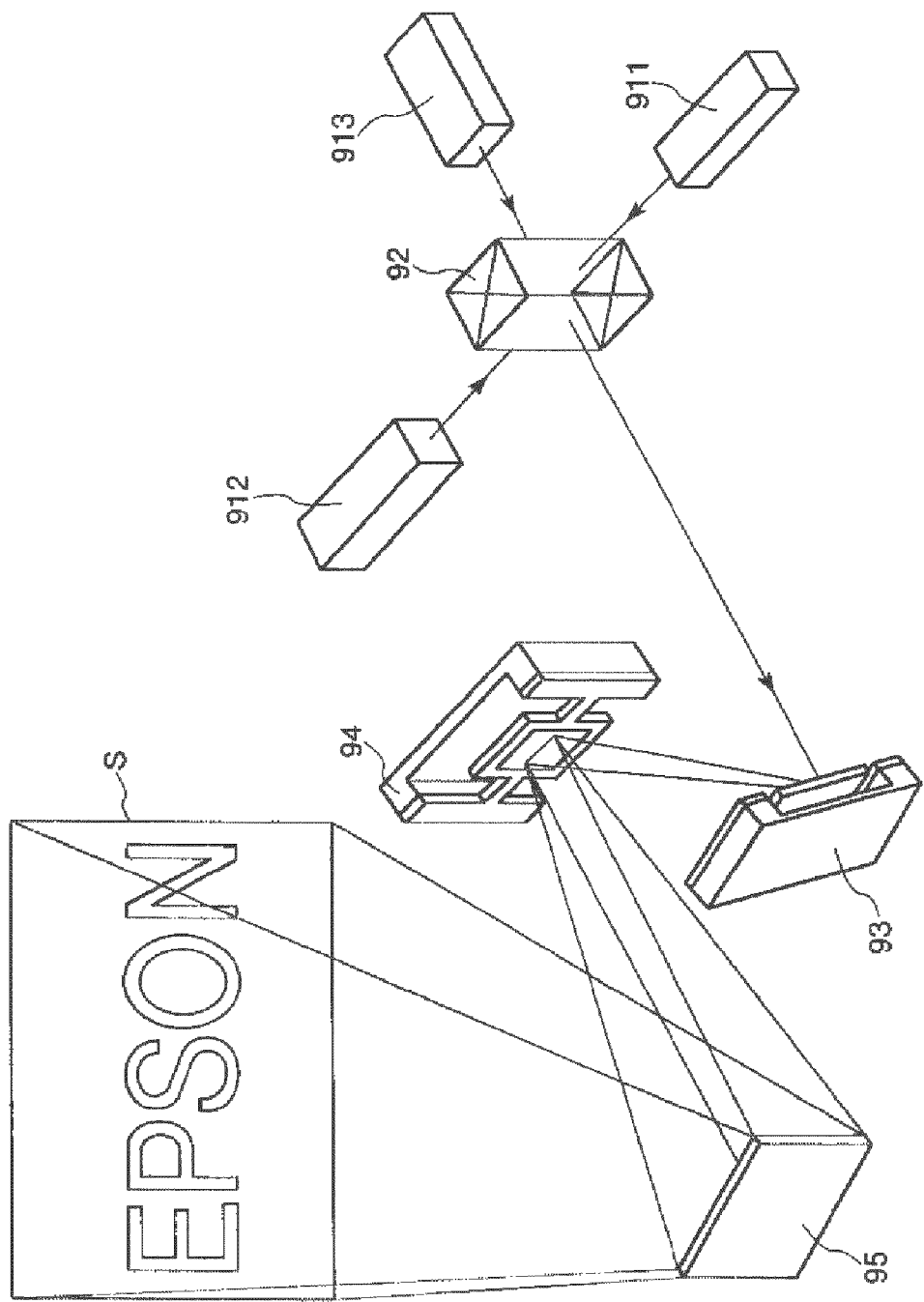
FIG. 11 is a schematic drawing for describing an image forming device according to the invention.

As an example of the image forming device, a projector 9 is now described with reference to FIG. 11. For the sake of description, the longitudinal direction of a screen S is referred as a "lateral direction (horizontal direction)" and the direction perpendicular to the longitudinal direction of the screen S is referred as a "upright direction (vertical direction)" in the following description.

The projector 9 has a light source device 91 that emits light such as leaser, a cross-dichroic prism 92, a pair of light scanners 93, 94, and a fixed mirror 95.

The light source device 91 includes a red light source device 911 that emits a red light beam, a blue light source device 912 that emits a blue light beam, and a green light source device 913 that emits a green light beam.

The cross-dichroic prism 92 has four rectangular prisms which adhered together and the cross-dichroic prism 92 it the optical element that synthesizes the light beams emitted from the red light source device 911, the blue light source device 912 and the green light source device 913.

In the projector 9, the light beams emitted from the red light source device 911, the blue light source device 912 and the green light source device 913 based on an image information from an unshown host-computer are synthesized through the cross-dichroic prism 92. The synthesized light beam is scanned by the optical scanners 93, 94, and then reflected by the fixed mirror 95, forming a color image on the screen S.

Light scanning by the optical scanners 93, 94 is now described. The light beam synthesized at the cross-dichroic prism 92 is scanned in the lateral direction (hereinafter called "main scanning") by the optical scanner 93. The scanned light beam is then scanned in the upright direction (hereinafter called "vertical scanning") by the optical scanner 94. Though the scanning, a two-dimensional color image can be formed on the screen S.

Where the optical scanner according to the embodiment of the invention is adopted as the above-mentioned optical scanners 93, 94, it is possible to provide the projector 9 (image-forming device) which is small and has a fine image forming characteristic.

The rotational motion speed of the optical scanner 94 which performs the vertical scanning is generally slower than the rotational motion speed of the optical scanner 93 performs the main scanning. Though it depends on a type or size of an image, the rotation frequency of the optical scanner 94 which performs the vertical scanning is typically about 60 Hz and the rotation frequency of the optical scanner 93 performs the main scanning is typically about 10-256 kHz. In this extent, by adopting the optical scanner according to the invention as such optical scanners 93, 94, it is possible to easily offer the optical scanner having appropriate torsional spring constants appropriate for the main scanning and the vertical scanning respectively. Therefore, it is possible to provide the projector 9 (image-forming device) which is small and has a fine image forming characteristic. Configuration or structure of the projector 9 is not particularly limited provided that it can form a colored image on the screen S.

The invention is obviously not limited to the specific embodiments described herein, but also encompasses any variations that may be considered by any person skilled in the art, within the general scope of the invention. For example the structures of the actuator 1 of the invention can be replaced by other structures that serve the equivalent functions. Furthermore, any structure can be added to the embodiments.

Though the structure having the symmetric shape with respect to the face which includes the center of the actuator and which is perpendicular to the X-rotational central axis of the weight part and the driving member, the structure can be asymmetric.

The resin part of the weight part, the resin part of the elastic part and the resin part of the supporting part were formed so as to form a single body in the above-described embodiment. However, the structure is not limited to this provided that it can be strong enough for the rotational motion of the weight part 21.

The elastic part has the layered structure of the resin part and the silicon part throughout the longitudinal direction in the above-described embodiment. The elastic part is not limited to this but can be any structure provided that the torsional spring constants of the pair of the elastic parts are adjustable. For example, it can be an elastic part in which the silicon part and/or the resin part are partially formed in the longitudinal direction.

Though each connecting part is formed from a single elastic part (elastic material), it is not limited as long as the weight part can be rotated with it.

The number, location and shape of the elastic part provided at the connecting part are not particularly set. For example, I: A pair of elastic parts can be provided so as to oppose each other with the rotational central axis its center when it is viewed in plan. In this case, each elastic part may have the layered structure of the silicon part and the resin part or any one of the elastic parts may have the layered structure. II: The elastic part of each connecting part may be ramified in its longitudinal direction. In this case, the layered structure is adopted from one end of the elastic part to the ramified part for example, and a rest of the part from the ramified part to the other end of the elastic part may be formed only from the silicon part. III: Each connecting part may have a first elastic part that extends on the rotational central axis and a second elastic part that is the pair of the elastic parts opposing each other with the rotational central axis therebetween. In this case, the first elastic part may be made only from the silicon part and the second elastic part may be made from the layered structure of the silicon part and the resin part.

Though the above-embodiments are the single-degree-of-freedom vibration system, it is not limited. For example a second-degree-of-freedom vibration system can be adopted as long as the weight part can be rotated. More specifically, each connecting part may have a plate-shaped driving member, a first elastic part that coupled the driving member and the supporting part, and a second elastic part that couples the driving member and the weight part. In this case, the layered structure of the silicon part and the resin part is formed at least in a part of the first elastic part and/or the second elastic part.

What is claimed is:

1. An actuator, comprising:
   a weight part;
   a supporting part supporting the weight part;
   a connecting part coupling the weight part rotatable to the supporting part and having an elastic part;

a driving member driving and rotating the weight part, wherein the driving member includes a coil provided on the weight part and a voltage supply applying a voltage to the coil, the weight part is rotated by applying the voltage to the coil through the voltage supply;

an amplifier circuit driving the weight part; and a behavior detector detecting the behavior of the weight part based on a signal received from the amplifier circuit, wherein the driving member is operated to torsionally deform the elastic part and rotate the weight part, the elastic part includes a resin layer and the torsional spring constant of the elastic part is adjusted by the thickness of the resin layer, the supporting part includes at least a second layer, the amplifier circuit being disposed on the second layer.

2. The actuator according to claim 1, wherein the behavior detector includes a stress detection element detecting a stress of the elastic part.

3. The actuator according to claim 1, wherein the behavior detector includes a light source and a photodiode receiving a light of the light source.

4. An optical scanner, comprising:

a weight part having a light reflecting part that has a light reflecting property; a supporting part supporting the weight part;

a connecting part coupling the weight part rotatable to the supporting part and having an elastic part;

a driving member driving and rotating the weight part, wherein the driving member includes a coil provided on the weight part and a voltage supply applying a voltage to the coil, the weight part is rotated by applying the voltage to the coil through the voltage supply;

an amplifier circuit driving the weight part; and a behavior detector detecting the behavior of the weight part based on a signal received from the amplifier circuit, wherein the driving member is operated to torsionally deform the elastic part and rotate the weight part, the elastic part includes a resin layer and the torsional spring constant of the elastic part is adjusted by the thickness of the resin layer, the supporting part includes at least a second layer, the amplifier circuit being disposed on the second layer.

* * * * *